United States Patent
Howard et al.

(10) Patent No.: US 9,522,497 B2
(45) Date of Patent: Dec. 20, 2016

(54) THERMOFORMING SHEET LOADING APPARATUS AND METHOD

(71) Applicant: NIKE, Inc., Beaverton, OR (US)

(72) Inventors: Chad E. Howard, Hillsboro, OR (US); Zvi Rapaport, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 347 days.

(21) Appl. No.: 14/204,644

(22) Filed: Mar. 11, 2014

(65) Prior Publication Data

US 2014/0252689 A1 Sep. 11, 2014

Related U.S. Application Data

(62) Division of application No. 13/187,116, filed on Jul. 20, 2011, now Pat. No. 8,709,332.

(51) Int. Cl.
*B29C 51/10* (2006.01)
*B29C 51/12* (2006.01)
(Continued)

(52) U.S. Cl.
CPC .......... *B29C 51/105* (2013.01); *B29C 51/421* (2013.01); *B29C 65/008* (2013.01); *B29C 65/028* (2013.01); *B29C 65/7847* (2013.01); *B29C 65/7852* (2013.01); *B29C 66/1122* (2013.01); *B29C 66/4326* (2013.01); *B29C 66/474* (2013.01);
(Continued)

(58) Field of Classification Search
CPC .... B29C 51/261; B29C 51/105; B29C 51/262; B29C 51/12; B29C 51/421; B29C 51/445; B29C 66/543
See application file for complete search history.

(56) References Cited

U.S. PATENT DOCUMENTS 2,645,479 A 7/1953 Mitchell
3,412,183 A * 11/1968 Anderson ............. B29C 51/267
264/40.6
(Continued)

FOREIGN PATENT DOCUMENTS

DE 4338301 A1 * 5/1995 ......... B29C 49/0047
JP S63303719 A 12/1988
(Continued)

OTHER PUBLICATIONS

State Intellectual Property Office, Non-Final Office Action for Chinese Application No. 201280035987.X, mailed May 18, 2015.
(Continued)

*Primary Examiner* — Robert B Davis
(74) *Attorney, Agent, or Firm* — Honigman Miller Schwartz and Cohn LLP; Matthew H. Szalach; Jonathan P. O'Brien

(57) ABSTRACT

A thermoforming system includes a vacuum device operable to simultaneously hold a first object and a second object that are overlapped and abutted against each other. The system also includes a thermoforming machine that simultaneously receives the first object and the second object from the vacuum device. The thermoforming machine is further configured to heat the first and second objects. The thermoforming machine is further configured to attach the first and second objects together. Moreover, the thermoforming machine is configured to form the first and second objects into a thermoformed article.

27 Claims, 5 Drawing Sheets

(51) Int. Cl.
  *B29C 51/26* (2006.01)
  *B29C 51/42* (2006.01)
  *B29C 65/78* (2006.01)
  *B29C 65/00* (2006.01)
  *B29C 65/02* (2006.01)
  *B65H 3/08* (2006.01)
  *B29C 49/00* (2006.01)
  *B29L 9/00* (2006.01)
  *B29L 31/50* (2006.01)
  *B29L 22/02* (2006.01)
  *B29C 49/42* (2006.01)
  *B29C 51/44* (2006.01)
  *B29C 49/20* (2006.01)

(52) U.S. Cl.
  CPC ............ *B29C 66/532* (2013.01); *B29C 66/54* (2013.01); *B29C 66/543* (2013.01); *B29C 66/61* (2013.01); *B29C 66/8322* (2013.01); *B65H 3/0816* (2013.01); *B29C 49/4205* (2013.01); *B29C 51/12* (2013.01); *B29C 51/261* (2013.01); *B29C 51/262* (2013.01); *B29C 51/445* (2013.01); *B29C 2049/0057* (2013.01); *B29C 2049/2013* (2013.01); *B29C 2049/2078* (2013.01); *B29C 2791/006* (2013.01); *B29C 2791/007* (2013.01); *B29L 2009/001* (2013.01); *B29L 2022/025* (2013.01); *B29L 2031/50* (2013.01)

(56) References Cited

U.S. PATENT DOCUMENTS

| | | | |
|---|---|---|---|
| 3,539,416 A * | 11/1970 | Sanders | B29B 13/023 156/228 |
| 4,267,142 A | 5/1981 | Lankheet | |
| 4,636,348 A * | 1/1987 | Whiteside | B29C 51/082 264/153 |
| 5,409,767 A * | 4/1995 | Trudeau | B29C 31/08 264/101 |
| 5,848,785 A | 12/1998 | Hardwick et al. | |
| 5,972,151 A * | 10/1999 | Sbrana | B29C 33/12 156/229 |
| 6,095,514 A | 8/2000 | Kudo et al. | |
| 6,349,930 B1 | 2/2002 | Kruger et al. | |
| 6,440,353 B1 | 8/2002 | Hutchins | |
| 6,659,758 B2 | 12/2003 | Ekendahl et al. | |
| 6,705,853 B1 | 3/2004 | Nehring | |
| 6,969,246 B1 | 11/2005 | Kundinger et al. | |
| 7,045,086 B2 | 5/2006 | Fitzell, Jr. | |
| 7,665,982 B2 | 2/2010 | Lucier et al. | |
| 7,972,129 B2 | 7/2011 | O'Donoghue | |
| 8,709,332 B2 | 4/2014 | Rapaport et al. | |
| 2005/0133980 A1 | 6/2005 | Koga | |
| 2007/0023990 A1 | 2/2007 | Lassen | |
| 2008/0179003 A1 | 7/2008 | Yuen | |

FOREIGN PATENT DOCUMENTS

| | | |
|---|---|---|
| WO | 0194207 | 12/2001 |
| WO | WO-2009023370 A1 | 2/2009 |

OTHER PUBLICATIONS

European Patent Office, Extended European Search Report for EP Application No. 12814588, mailed Aug. 10, 2015.

International Search Report from International Application No. PCT/US2012/047156, mailed Sep. 21, 2012.

* cited by examiner

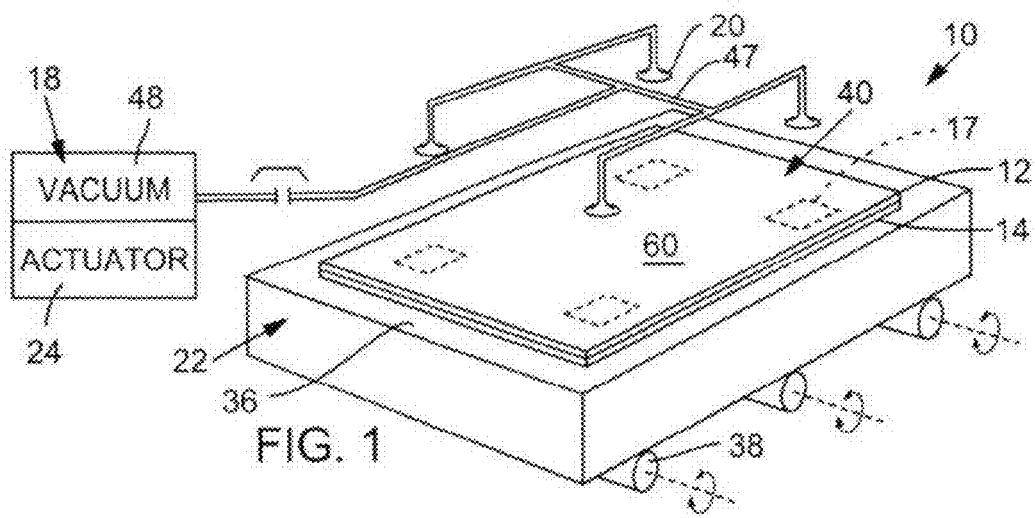
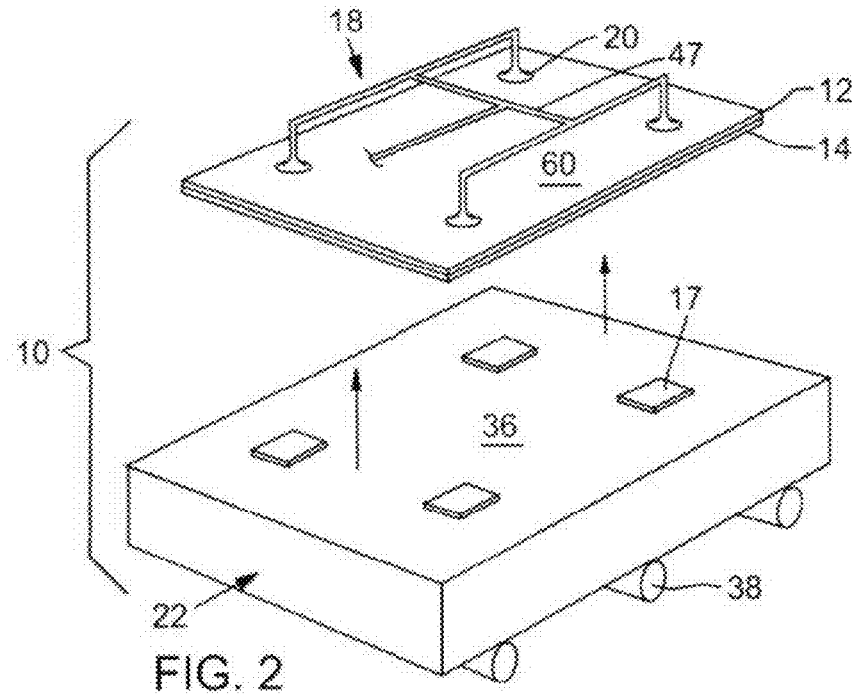
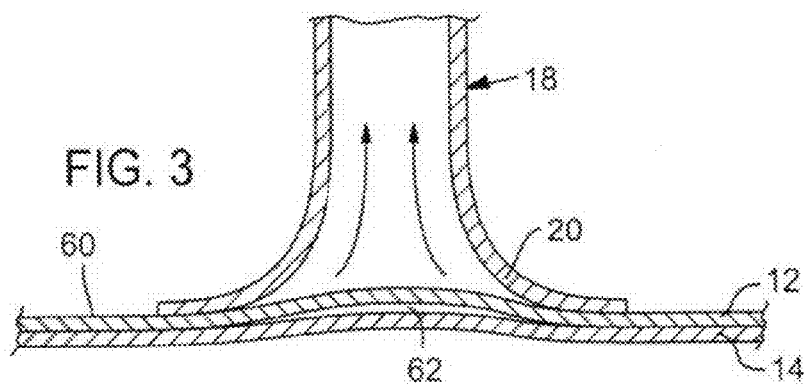

THERMOFORMING SHEET LOADING APPARATUS AND METHOD

CROSS-REFERENCE TO RELATED APPLICATION

This application is a divisional application of application Ser. No. 13/187,116, filed Jul. 20, 2011, published as U.S. Patent Publication No. 2013/0020743 on Jan. 24, 2013, the disclosure of which is hereby incorporated by reference in its entirety.

FIELD

The present disclosure relates to thermoforming and, more particularly, to a thermoforming sheet loading apparatus and method.

BACKGROUND

Thermoforming is a manufacturing process in which an object, such as a polymeric sheet or film, is heated until pliable, formed into a shape with a mold, and then cooled. Twin sheet thermoforming is a related process in which two objects are heated, formed by respective molds, bonded together while still hot, and then cooled to form, typically, a hollow article. With these processes, articles can be formed in a wide variety of shapes, and the articles can be produced efficiently using a variety of materials.

In the case of twin sheet thermoforming, the sheets are often loaded independently into the thermoforming oven, which can disadvantageously increase manufacturing time. Also, in some cases, the sheets are each connected to opposite sides of a spacer, and the assembly is loaded into the oven. In this latter case, attaching the sheets to the spacer can take a significant amount of time, and/or the formed part typically needs to be cut from the spacer, each of which reduces manufacturing efficiency. Moreover, in some cases, a frame, insert, or other object is sometimes introduced between the molds to properly form the article, and positioning these parts between the molds can be additionally time consuming and can negatively impact manufacturing efficiency.

SUMMARY

A thermoforming system is disclosed that includes a vacuum device operable to simultaneously hold and simultaneously transfer from a first location a first object and a second object that are overlapped and abutted against each other. The system also includes a thermoforming machine that simultaneously receives the first object and the second object from the vacuum device. The thermoforming machine is further configured to heat the first and second objects. The thermoforming machine is further configured to attach the first and second objects together. Moreover, the thermoforming machine is configured to form the first and second objects into a thermoformed article.

A forming system for forming an article from a first object and a second object is also disclosed. The forming system includes a loading member with a support surface in a first location. The support surface is configured to support the first object and the second object in a stack. The first object and the second object overlap and abut against each other in the stack. The system also includes a suction member, an actuator, and a forming machine. The suction member is configured to apply suction to the first object at the first location to cause the first object to be secured to the suction member. Also, the actuator is configured to simultaneously transport the suction member, the first object, and the second object away from the first location and toward a second location. The first object is secured to the suction member via suction, and the second object is secured to the suction member via the first object. The suction member is configured to simultaneously surrender the first object and the second object to the second location. The forming machine is disposed proximate the second location and is configured to attach the first object and the second object together.

A thermoforming system for forming an article from a first object, a second object, and an insert is additionally disclosed. The thermoforming system includes a loading member with a support surface in a first location. The support surface is configured to support the first object and the second object in a stack, and the first object and the second object overlap and abut against each other in the stack. The system further includes a suction member, an actuator, a handling device, and a thermoforming machine with a mold. The suction member is configured to apply suction to the first object at the first location to cause the first object to be secured to the suction member. The actuator is configured to simultaneously transport the suction member, the first object, and the second object away from the first location and toward the handling device. The first object is secured to the suction member via suction. The handling device is configured to simultaneously receive the first object and the second object from the suction member. Moreover, the handling device is configured to create a space between the first object and the second object, wherein the space is configured to receive the insert. The mold of the thermoforming machine is configured to attach the first object to the insert, the second object to the insert, and the first object to the second object.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of a portion of a thermoforming system for thermoforming an article;

FIG. 2 is a schematic view the thermoforming system of FIG. 1;

FIG. 3 is a schematic view the thermoforming system of FIG. 1;

Corresponding reference numerals indicate corresponding parts throughout the several views of the drawings.

DETAILED DESCRIPTION

Example embodiments will now be described more fully with reference to the accompanying drawings.

Referring to FIGS. 1-10, a system 10 for attaching a first object 12 and a second object 14 together is schematically illustrated. The system 10 can be a thermoforming system 10 and can be used for twin sheet thermoforming processes in some embodiments; however, it will be appreciated that the teachings of the present disclosure can be applied to other types of systems and manufacturing methods without departing from the scope of the present disclosure.

Figure 8:
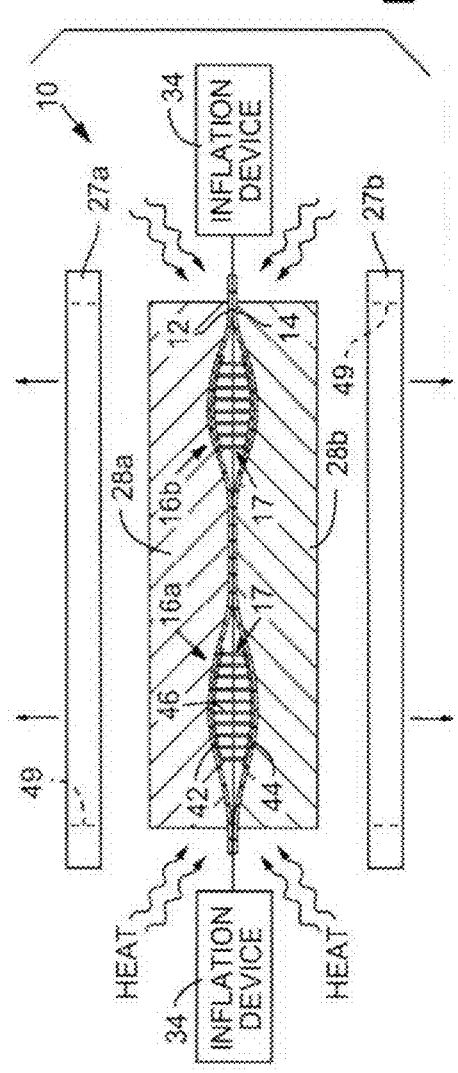
FIG. 8 is a schematic view the thermoforming system of FIG. 1.
Figure 9:
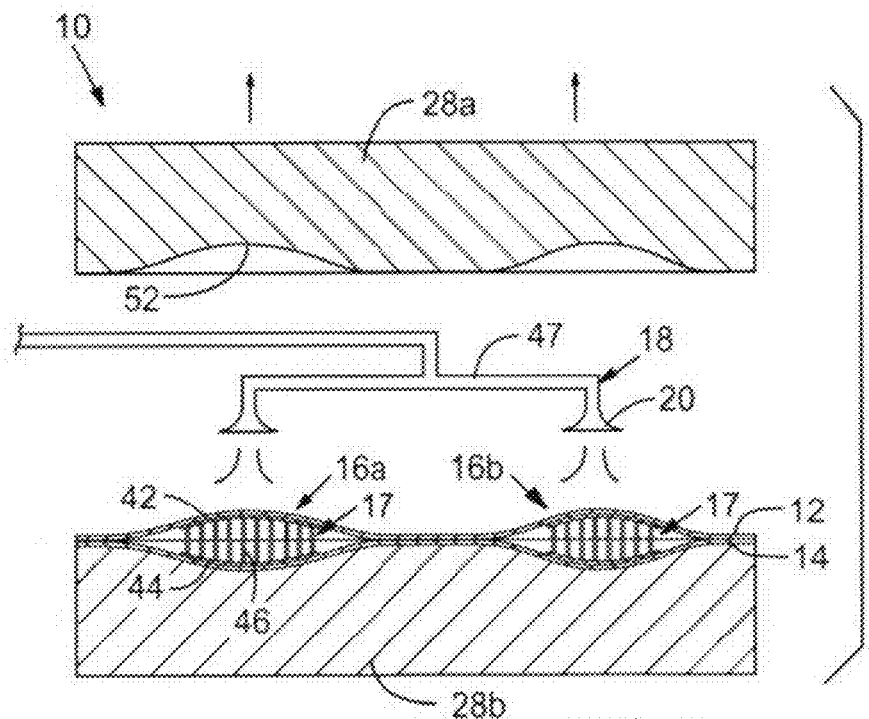
FIG. 9 is a schematic view the thermoforming system of FIG. 1.
Figure 10:
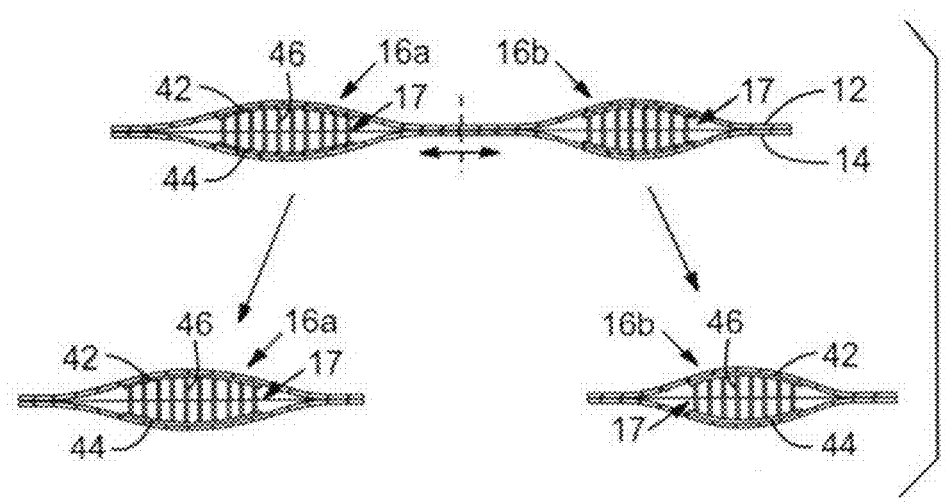
FIG. 10 is a schematic view the system of FIG. 1.

In the case of a thermoforming system 10, the first and second objects 12, 14 can be heated, formed, and attached to form an article, such as a bladder 16a, 16b (FIGS. 8-10). More specifically, as will be discussed, the system 10 can manipulate and transport the first and second objects 12, 14, place an insert 17 between the objects 12, 14, and substantially seal the objects 12, 14 together to form a plurality of bladders 16a, 16b in a very efficient manner. The bladders 16a, 16b can be included in an article of footwear, in shin guards or other sports equipment, or in any other suitable item (not shown). However, it will be appreciated that the system 10 can be used for manufacturing any suitable article other than a bladder 16a, 16b without departing from the scope of the present disclosure.

Figure 4:
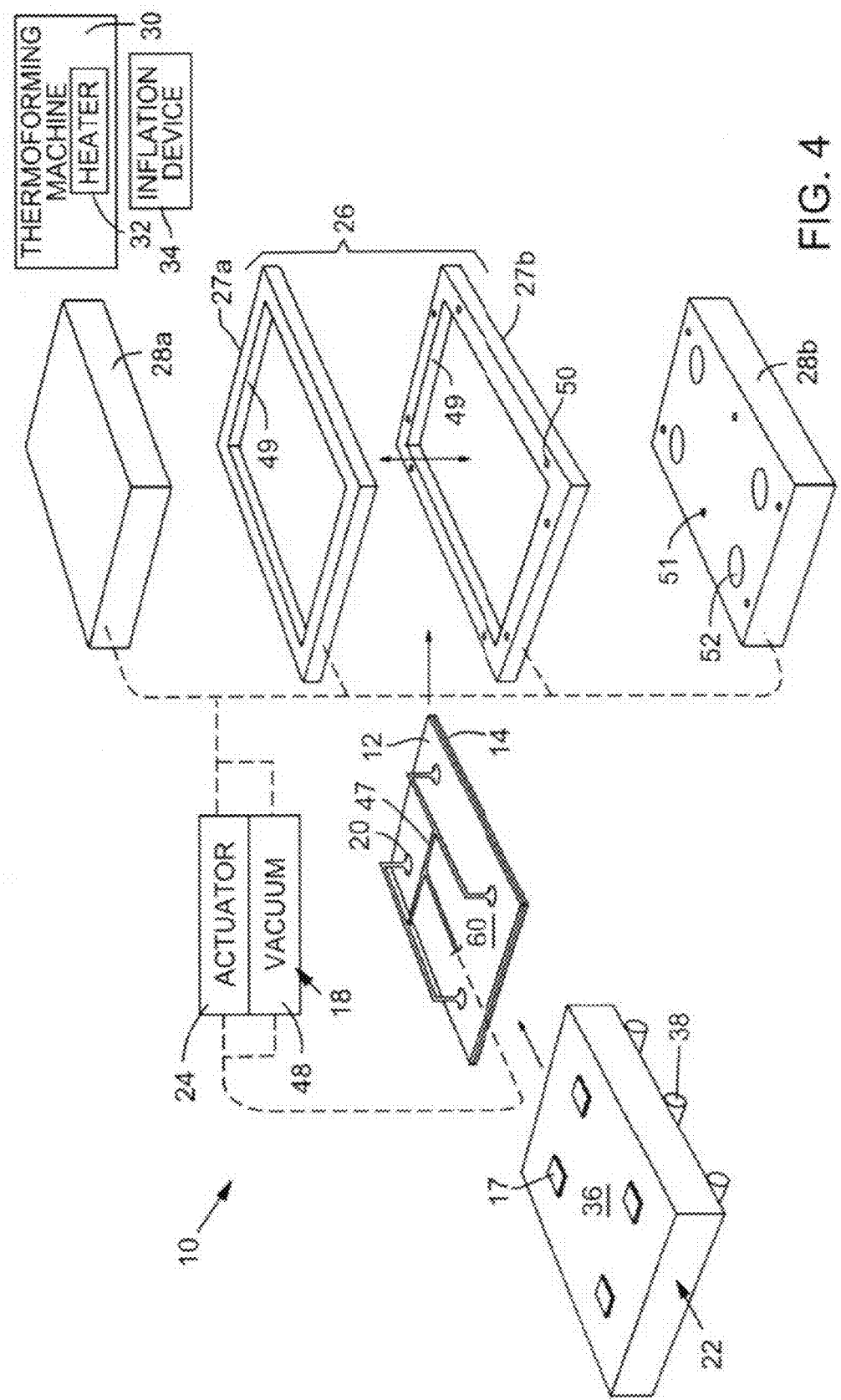
FIG. 4 is a schematic view the thermoforming system of FIG. 1.

As schematically illustrated in FIG. 4, the system 10 can include a vacuum device 18 with one or more suction members 20 (i.e., suction heads). The system 10 can also include a loading member 22, an actuator 24, and a handling device 26 with one or more vacuum racks 27a, 27b (i.e., suction members). Furthermore, the system 10 can include a thermoforming machine 30 with a heating device 32, molds 28a, 28b, and an inflation device 34.

Figure 5:
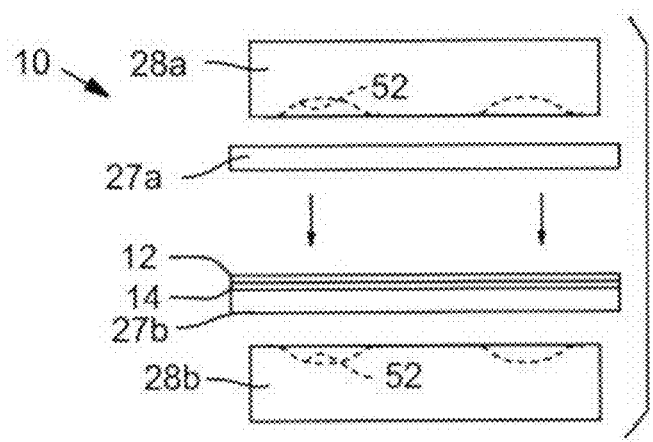
FIG. 5 is a schematic view the thermoforming system of FIG. 1.
Figure 6:
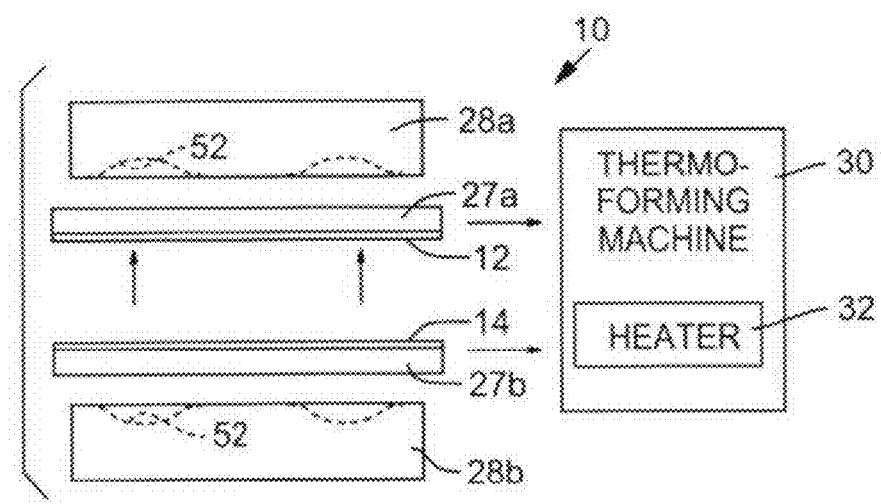
FIG. 6 is a schematic view the thermoforming system of FIG. 1.
Figure 7:
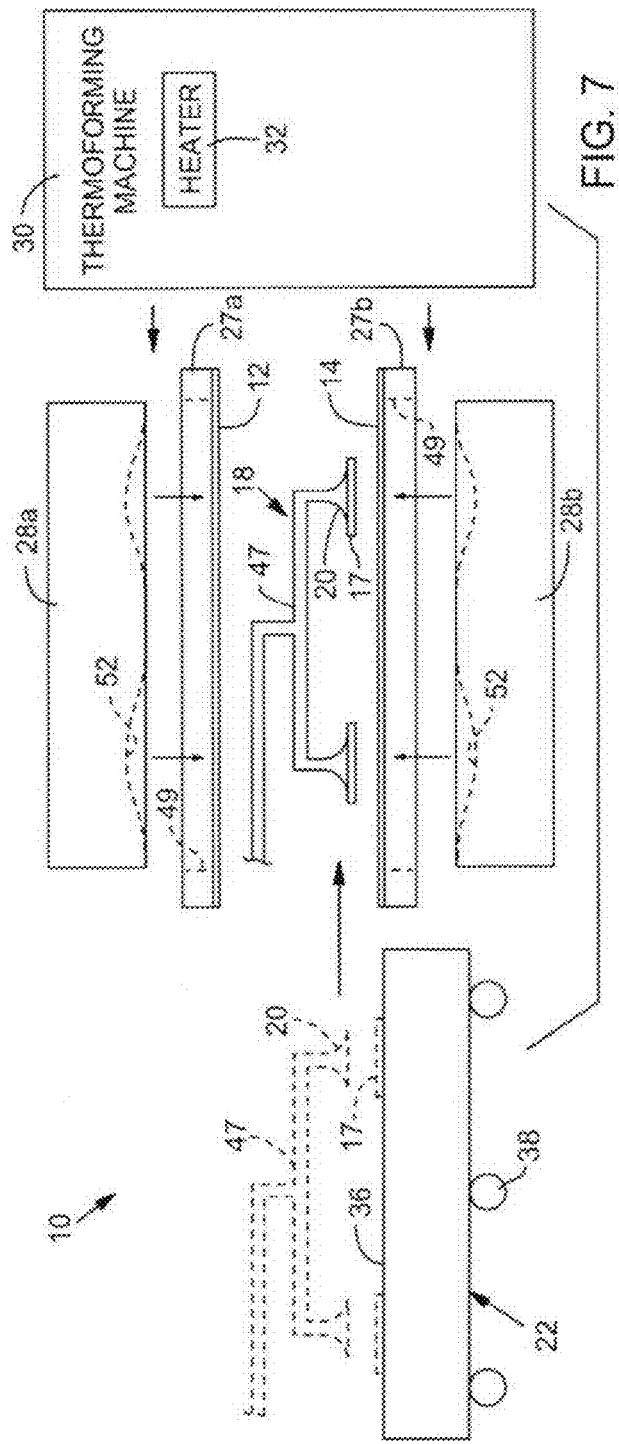
FIG. 7 is a schematic view the thermoforming system of FIG. 1.

Generally, the objects 12, 14 and the inserts 17 can be layered and stacked on the loading member 22 as shown in FIG. 1. Then, as shown in FIGS. 2 and 3, the suction members 20 of the vacuum device 18 can seize (hold, retain, etc.) the first and second objects 12, 14 simultaneously and lift or otherwise transport the first and second objects 12, 14 away from the loading member 22. Next, as shown in FIG. 4, the actuator 24 can cause the suction members 20 of the vacuum device 18 to transport the first and second objects 12, 14 simultaneously to the handling device 26, whereupon the objects 12, 14 are subsequently surrendered to the handling device 26 (FIG. 5). Then, as shown in FIGS. 5 and 6, the vacuum racks 27a, 27b can couple to the first and second objects 12, 14, respectively, and separate the first and second objects 12, 14. Next, the objects 12, 14 can be heated by the heating device 32 until pliable. Subsequently, as shown in FIG. 7, the inserts 17 can be placed between the first and second objects 12, 14. Then, as shown in FIG. 8, the molds 28a, 28b can be used to form and attach the objects 12, 14 together while heat is applied and while the inflation device 34 inflates the area between the objects 12, 14. Next, as shown in FIG. 9, the molds 28a, 28b can be separated and the vacuum device 18 can remove the bladders 16a, 16b therefrom. Then, the individual bladders 16a, 16b can be separated from each other, and the bladders 16a, 16b can be individually trimmed to remove excess material as shown in FIG. 10.

As will be discussed, the system 10 and its method of operation can manufacture the bladders 16a, 16b in a very efficient manner. For instance, because the first and second objects 12, 14 are seized, held, and transported simultaneously by the vacuum device 18, the manufacturing process can be completed relatively quickly, without the need for redundant handling equipment, and with relatively little preparation of the objects 12, 14. Also, one or more operations can be partially or completely automated, for instance, using one or more robots. As such, the bladders 16a, 16b can be made relatively quickly, and the bladders 16a, 16b can be formed within high tolerances in a repeatable fashion.

Various features of the system 10 will now be discussed in greater detail. As shown in FIGS. 1, 2 and 4, the loading member 22 can be a sturdy platform with a substantially flat support surface 36. The loading member 22 can also be mobile. For instance, the loading member 22 can include one or more wheels 38 for moveably supporting the loading member 22. In some embodiments, the loading member 22 can be manually moved, but in other embodiments, the loading member 22 can be motorized or otherwise automatically moved.

As shown in FIG. 1, the first and second objects 12, 14 and inserts 17 can be arranged in a stack 40 on the support surface 36. For instance, the first object 12 can be overlapped and layered directly over the second object 14 such that the first and second objects 12, 14 are aligned and are directly abutting each other (i.e., abuttingly layered). Also, the second object 14 can be overlapped and layered directly over the inserts 17. Also, the stack 40 can be arranged according to the number and position of the suction members 20 of the vacuum device 18. For instance, the first and second objects 12, 14 can be positioned on the surface 36 such that the weight of the objects 12, 14 can be distributed substantially evenly between the suction members 20. Also, each of the inserts 17 can be spaced apart according to the spacing of the suction members 20 so that each suction member 20 is able to seize one of the inserts 17 as will be discussed.

Moreover, although the stack 40 illustrated in FIG. 1 includes only the first object 12, the second object 14, and the inserts 17 in respective layers, it will be appreciated that the stack 40 could include a series of first and second objects 12, 14 and inserts 17. For instance, the stack 40 could include the first object 12, which is layered over the second object 14, which is layered over the inserts 17, which are layered over another first object 12, which is layered over another second object 14, which is layered over additional inserts 17, and so on. Also, the stack 40 can be arranged manually or automatically by an automated feeder, conveyer, etc.

The objects 12, 14, can be of any suitable type, such as substantially flat sheets of polymeric material. For instance, the objects 12, 14 can be made of urethane material with a microlayer construction. In some embodiments, the objects 12, 14 can be made of or include one or more materials discussed in U.S. Pat. No. 5,952,065, U.S. Pat. No. 5,713,141, U.S. patent application Ser. No. 08/580,946 (now abandoned), U.S. Pat. No. 6,521,305, U.S. Pat. No. 6,620,472, U.S. patent application Ser. No. 08/475,276 (now abandoned), U.S. Pat. No. 6,599,597, U.S. Pat. No. 6,730,379, U.S. Pat. No. 7,851,036, U.S. patent application Ser. No. 08/475,275 (now abandoned), U.S. Pat. No. 6,203,868, U.S. Pat. No. 6,321,465, U.S. Pat. No. 6,013,340, U.S. Pat. No. 6,391,405, U.S. Pat. No. 6,797,215, U.S. Pat. No. 6,652,940, U.S. Pat. No. 6,692,803, U.S. Pat. No. 7,078,091, U.S. Pat. No. 6,127,026, U.S. Pat. No. 6,082,025, U.S. Pat. No. 6,846,534, and/or U.S. Pat. No. 6,582,786, each of which is hereby incorporated by reference in its entirety.

The inserts 17 can be made out of any suitable material. For instance, as shown in FIGS. 8-10, the inserts 17 can include a first sheet portion 42, a second sheet portion 44, and a plurality of connecting members 46. The inserts 17 can include materials disclosed in U.S. Pat. No. 6,119,371, which issued Sep. 19, 2000, and which is hereby incorporated by reference in its entirety.

Additionally, the vacuum device 18 can include any number of suction members 20. The suction members 20 can each be coupled to a support frame 47. The support frame 47 can be a rigid member with fluid passageways extending therethrough, and the suction members 20 can be suspended from respective ends of the support frame 47. The support frame 47 can also be in fluid communication with a vacuum source 48. As such, the suction members 20 can be at a fixed distance away from each other at respective ends of the frame 47, and the suction members 20 can be in communication with the vacuum source 48 via the passageways extending through the frame 47.

The vacuum device 18 and the vacuum source 48 can also be operably coupled to the vacuum racks 27a, 27b of the handling device 26 as shown in FIG. 4. Moreover, the vacuum device 18 and the vacuum source 48 can be operably coupled to the molds 28a, 28b as shown in FIG. 4. In other embodiments, the system 10 can include separate, independent vacuum sources 48 for providing suction to the suction members 20, the vacuum racks 27a, 27b, and the molds 28a, 28b.

The vacuum racks 27a, 27b can be rectangular, frame-shaped members, each with a respective opening 49. The vacuum racks 27a, 27b can also include one or more ports 50 (FIG. 4). In the embodiments illustrated, the vacuum racks 27a, 27b each include a respective elongate, groove-shaped port 50. The ports 50 can be in communication with the vacuum source 48. Thus, as will be discussed, the vacuum rack 27a can provide suction to the first object 12 to thereby retain the first object 12, and the vacuum rack 27b can provide suction to the second object 14 to thereby retain the second object 14.

The actuator 24 can be of any suitable type, such as an electrically powered, programmable robot. The actuator 24 can also include one or more pneumatically-powered actuators, one or more hydraulically-powered actuators, or any other suitable type of actuator 24. The actuator 24 can be operably coupled to the frame 47, to the vacuum racks 27a, 27b, to the molds 28a, 28b, or any other component of the system 10 for actuating the same. It will be appreciated that there can be a common actuator 24 for actuating different components, or there can be a plurality of independent actuators 24 for actuating single components. The actuator 24 can move linearly and/or rotationally in any suitable direction.

Moreover, the actuator 24 can provide relative movement between, for instance, the frame 47 and the thermoforming machine 30. As such, the actuator 24 can move the frame 47 while the machine 30 remains stationary, or vice versa, or the actuator 24 can move both the frame 47 and the machine 30 simultaneously relative to each other. The actuator 24 can provide similar relative movement between any of the components of the system 10 as well.

Additionally, as shown in FIGS. 4-6, the molds 28a, 28b can be substantially solid members with one or more female cavities 52 therein. The cavities 52 can be three-dimensionally curved according to the desired shape of the bladder 16a, 16b. The molds 28a, 28b can be operably coupled to the actuator 24 to move toward and away from each other. The molds 28a, 28b can also include one or more ports 51 (FIG. 4), which are in communication with the vacuum source 48 such that the molds 28a, 28b can provide suction to the first and second objects 12, 14 as will be discussed below.

As shown in FIG. 8, the molds 28a, 28b can move toward each other to form the bladders 16a, 16b within the cavities 52. Then, as shown in FIG. 9, the molds 28a, 28b can move apart to reveal the formed bladders 16a, 16b. In some embodiments, the width of the molds 28a, 28b can be less than the inner width of the openings 49 of the vacuum racks 27a, 27b (FIG. 4). As such, the molds 28a, 28b can be received in and move through the openings 49 for purposes that will be discussed. It will be appreciated that the molds 28a, 28b can include a single cavity 52 for forming a single bladder 16a, 16b, or as shown in FIGS. 4-9, the molds 28a, 28b can include multiple cavities 52 for forming a plurality of bladders 16a, 16b simultaneously.

Still further, the thermoforming machine 30 can include the heating device 32. The heating device 32 can be an electrical resistance-type heating device 32 or any other suitable type. Also, the thermoforming machine 30 can include a chamber (not specifically shown) that receives the vacuum racks 27a, 27b and/or the molds 28a, 28b.

The method of manufacturing of the bladders 16a, 16b will now be discussed in greater detail. It will be appreciated that the sequence of manufacturing can be varied in any suitable manner without departing from the scope of the present disclosure.

Beginning in FIG. 1, the stack 40 can be provided on the support surface 36. Then, the actuator 24 can actuate the frame 47 and the connected suction members 20 toward the support surface 36 until the suction members 20 directly contact and abut a top surface 60 of the first object 12. As shown in FIG. 3, the suction members 20 can provide suction to the top surface 60, and the suction members 20 can be lifted away from the support surface 36 such that the first object 12 is lifted from the support surface 36. Also, as a result, the second object 14 can be suspended from the first object 12 and lifted from the support surface 36 such that the first and second objects 12, 14 are seized, held, and lifted simultaneously by the suction members 20.

It will be appreciated that both the first and second objects 12, 14 can be held even though the suction members 20 directly contact only the first object 12. The second object 14 can be held to the first object 12 via static electricity. Also, as shown in FIG. 3, one or more substantially sealed cavities (microcavities) 62 can be defined between the first and second objects 12, 14, and as the first object 12 deforms due to the suction provided by the suction members 20, the cavity 62 can increase in volume to thereby reduce pressure in the cavity 62 and to thereby hold the second object 14 to the first object 12. A combination of these effects can also be employed for holding the second object 14 to the first object 12. Furthermore, in some embodiments, the static electricity between the first and second objects 12, 14 can be intentionally increased, for instance by applying ionized air, by wiping the first and/or second objects 12, 14 or in any other way.

In additional embodiments, the first object 12 can be porous such that suction can be provided to the second object 14 through the pores of the first object 12 and such that the first and second objects 12, 14 can be simultaneously held. It will also be appreciated that the suction members 20 or other suction devices can simultaneously seize, hold, retain, and transport the first and second objects 12, 14 in any suitable fashion other than those illustrated and described herein.

Once the first and second objects 12, 14 have been retained, the actuator 24 can actuate the frame 47 toward the vacuum racks 27a, 27b of the handling device 26 as shown in FIG. 4. For instance, the vacuum racks 27a, 27b can be disposed adjacent, but outside the thermoforming machine (FIG. 5), and the frame 47 can move between the vacuum racks 27a, 27b and deposit both objects 12, 14 on the vacuum rack 27b by reducing or eliminating suction from the suction members 20. Then, the frame 47 can move out from between the vacuum racks 27a, 27b.

Next, as shown in FIGS. 5 and 6, the vacuum rack 27a can move toward the objects 12, 14 and the vacuum rack 27b. Once the vacuum rack 27a contacts the first object 12 and provides suction thereto, the vacuum rack 27a can move away from the vacuum rack 27b to thereby separate the first and second objects 12, 14. At this point, the first object 12 can be held on the vacuum rack 27a via suction, and the second object 14 can be held on the vacuum rack 27b via suction.

Subsequently, as shown in FIG. 6, the vacuum racks 27a, 27b and attached objects 12, 14 can be moved toward the heating device 32 of the thermal forming machine 30 and heated. The first and second objects 12, 14 can be heated for any suitable amount of time (e.g., between approximately 30 seconds and 3 minutes) at any suitable temperature until pliable. In some embodiments, the first and second objects 12, 14 can be heated until both begin to droop slightly within or away from the respective openings 49 (FIG. 4) of the vacuum racks 27a, 27b.

While the objects 12, 14 are being heated, the suction members 20 can actuate back toward the loading member 22 to seize and lift the inserts 17 from the support surface 36. Then, the suction members 20 and inserts 17 can be moved toward the thermoforming machine 30.

Once the first and second objects 12, 14 have been sufficiently heated, the vacuum racks 27a, 27b can be removed from the thermoforming machine 30, and the inserts 17 can be deposited between the first and second objects 12, 14 using the vacuum device 18 as shown in FIG. 7. The inserts 17 can be located on the second object 14 such that each insert 17 is subsequently received in a respective cavity 52 of the molds 28a, 28b. In some embodiments, the mold 28b is actuated upwards and partially received within the opening 49 in the vacuum rack 27b to support the central portion of the second object 14 while the inserts 17 are placed thereon.

Next, as shown in FIG. 8, the vacuum device 18 can be removed from the molds 28a, 28b, and the molds 28a, 28b can be moved together. In some embodiments, the molds 28a, 28b can be received within the openings 49 of the vacuum racks 27a, 27b. Subsequently, as shown in FIG. 9, the vacuum racks 27a, 27b, the molds 28a, 28b, and the objects 12, 14 can be transported to the thermoforming machine 30, and heat can be further applied. The molds 28a, 28b can also apply pressure to the objects 12, 14 to thereby attach, affix, and fuse abutting surfaces of the objects 12, 14. Meanwhile, the first portion 42 of the insert 17 can attach to the first object 12 while the second portion 44 of the object can attach to the second object 14. Also, since the objects 12, 14 remain inside the respective cavities 52 of the molds 28a, 28b, the connecting members 46 can extend in length and remain attached to the first and second portions 42, 44.

In some embodiments, the suction provided by the molds 28a, 28b is sufficient to hold the objects 12, 14 within the respective cavities 52 of the molds 28a, 28b. Also, in some embodiments, the inflation device 34 can also provide pressurized gas into (i.e., inflate) the sealed space between the objects 12, 14 as shown in FIG. 8 to thereby form the objects 12, 14 according to the three-dimensionally curved interior surfaces of the cavities 52. In still additional embodiments, instead of the molds 28a, 28b providing suction and instead of inflating the space between the objects 12, 14 with the inflation devices 34, gravity or other forces cause the objects 12, 14 to move within the respective cavities 52 of the molds 28a, 28b to be formed therein.

Next, as shown in FIG. 9, the formed bladders 16a, 16b can be cooled, and the molds 28a, 28b and vacuum racks 27a, 27b can be moved away from each other. Then, the suction members 20 can be moved between the molds 28a, 28b in order to seize and remove the bladders 16a, 16b from the molds 28a, 28b. Subsequently, as shown in FIG. 10, the attached bladders 16a, 16b can be cut or otherwise separated from each other, and excess material (e.g., peripheral edges) can be trimmed, cut, or otherwise removed from each bladder as indicated by broken lines in FIG. 10. These cutting/separating processes can be completed automatically or manually.

Furthermore, although not illustrated, the bladders 16a, 16b can be each formed to include a port, a valve, or other feature, which can be used to further inflate the bladders 16a, 16b. Thus, manufacture of the bladders 16a, 16b can include further inflation of the bladders 16a, 16b up to a predetermined pressure. Then, the bladders 16a, 16b can be subsequently processed and assembled into an article of footwear, sports equipment, a backpack, or any other item.

Accordingly, the system 10 and its method of use described above can provide a highly efficient way of manufacturing bladders 16a, 16b or a number of other articles. For instance, the objects 12, 14 can be layered over each other on the support surface 36 quickly and easily and then automatically lifted therefrom simultaneously for further processing. This can significantly reduce preparation time and effort as compared to related prior art methods. Also, the objects 12, 14 can be subsequently handled, molded, and attached simultaneously in an automated fashion. Thus, the bladders 16a, 16b can be manufactured relatively quickly and within high tolerances.

While various embodiments of the present disclosure have been described, the description is intended to be exemplary, rather than limiting and it will be apparent to those of ordinary skill in the art that many more embodiments and implementations are possible that are within the scope of the present disclosure. Accordingly, the present disclosure is not to be restricted except in light of the attached claims and their equivalents. Also, various modifications and changes may be made within the scope of the attached claims.

What is claimed is:

1. A thermoforming system comprising:
   a vacuum device operable to simultaneously hold and simultaneously transfer from a first location a first object and a second object that are overlapped and abutted against each other;
   a thermoforming machine that simultaneously receives the first object and the second object from the vacuum device, the thermoforming machine further configured to heat the first and second objects, the thermoforming machine further configured to attach the first and second objects together, the thermoforming machine further configured to form the first and second objects into a thermoformed article; and
   a handling device, the vacuum device operable to surrender the first and second objects to the handling device, the handling device operable to separate the first and second objects.

2. The thermoforming system of claim 1, wherein the vacuum device includes a suction member operable to simultaneously hold the first and second objects by directly contacting only one of the first and second objects.

3. The thermoforming system of claim 2, wherein the suction member is operable to simultaneously hold the first and second objects with the other of the first and second objects suspended from the one of the first and second objects.

4. The thermoforming system of claim 1, wherein the vacuum device is further operable to hold an insert and to place the insert between the first and second objects before the thermoforming machine attaches the first and second objects together.

5. The thermoforming system of claim 4, further comprising a support surface on which a stack is deposited, the stack including the first and second objects and the insert.

6. The thermoforming system of claim 1, further comprising an inflation device that inflates a substantially sealed area between the first and second objects.

7. A forming system for forming an article from a first object and a second object, the forming system comprising:
 a loading member with a support surface in a first location, the support surface configured to support the first object and the second object in a stack, wherein the first object and the second object overlap and abut against each other in the stack;
 a suction member;
 an actuator; and
 a forming machine, wherein the suction member is configured to apply suction to the first object at the first location to cause the first object to be secured to the suction member; wherein the actuator is configured to simultaneously transport the suction member, the first object, and the second object away from the first location and toward a second location, the first object being secured to the suction member via suction, and the second object being secured to the suction member via the first object, wherein the suction member is configured to simultaneously surrender the first object and the second object to the second location, and wherein the forming machine is disposed proximate the second location and is configured to attach the first object and the second object together;
 wherein the actuator is configured to lift the suction member away from the first location with the first object secured to the suction member and the second object suspended from the first object; and
 wherein the suction member is configured to suspend the second object from the first object by deforming the first object to increase a volume of a substantially sealed cavity between the first object and the second object.

8. The forming system of claim 7, further comprising a handling device that is disposed at the second location, wherein the suction member is configured to simultaneously surrender the first object and the second object to the handling device, and wherein the handling device is configured to separate the first object and the second object.

9. The forming system of claim 8, wherein the suction member is configured to place an insert between the first object and the second object.

10. The forming system of claim 8, wherein the handling device includes a first vacuum rack and a second vacuum rack, wherein the suction member is configured to simultaneously surrender the first object and the second object to the second vacuum rack, and wherein the first vacuum rack is configured to seize the first object and leave the second object secured to the second vacuum rack.

11. The forming system of claim 7, wherein the forming machine is a thermoforming machine that is configured to heat the first object and the second object, wherein the thermoforming machine includes a mold that is configured to shape at least one of the first object and the second object.

12. The forming system of claim 11, further comprising an inflation device that is configured to inflate an area defined between the first object and the second object.

13. A thermoforming system for forming an article from a first object, a second object, and an insert, the thermoforming system comprising:
 a loading member with a support surface in a first location, the support surface configured to support the first object and the second object in a stack, wherein the first object and the second object overlap and abut against each other in the stack;
 a suction member;
 an actuator;
 a handling device; and
 a thermoforming machine with a mold, wherein the suction member is configured to apply suction to the first object at the first location to cause the first object to be secured to the suction member; wherein the actuator is configured to simultaneously transport the suction member, the first object, and the second object away from the first location and toward the handling device, the first object being secured to the suction member via suction, and the second object being secured to the suction member via the first object, wherein the handling device is configured to simultaneously receive the first object and the second object from the suction member, wherein the handling device is configured to create a space between the first object and the second object, wherein the space is configured to receive the insert, and wherein the mold of the thermoforming machine is configured to attach the first object to the insert, the second object to the insert, and the first object to the second object.

14. The thermoforming system of claim 13, wherein the handling device includes a vacuum rack with an opening, wherein the opening is configured to receive the mold.

15. The thermoforming system of claim 13, further comprising an inflation device that is configured to inflate an area defined between the first object and the second object.

16. The thermoforming system of claim 13, wherein the actuator is configured to lift the suction member away from the first location with the first object secured to the suction member and the second object suspended from the first object.

17. A thermoforming system comprising:
 a vacuum device operable to simultaneously hold and simultaneously transfer from a first location a first object and a second object that are overlapped and abutted against each other;
 a thermoforming machine that simultaneously receives the first object and the second object from the vacuum device, the thermoforming machine further configured to heat the first and second objects, the thermoforming machine further configured to attach the first and second objects together, the thermoforming machine further configured to form the first and second objects into a thermoformed article; and
 an inflation device that inflates a substantially sealed area between the first and second objects.

18. The thermoforming system of claim 17, wherein the vacuum device includes a suction member operable to simultaneously hold the first and second objects by directly contacting only one of the first and second objects.

19. The thermoforming system of claim 18, wherein the suction member is operable to simultaneously hold the first and second objects with the other of the first and second objects suspended from the one of the first and second objects.

20. The thermoforming system of claim 17, wherein the vacuum device is further operable to hold an insert and to place the insert between the first and second objects before the thermoforming machine attaches the first and second objects together.

21. The thermoforming system of claim 20, further comprising a support surface on which a stack is deposited, the stack including the first and second objects and the insert.

22. A forming system for forming an article from a first object and a second object, the forming system comprising:
   a loading member with a support surface in a first location, the support surface configured to support the first object and the second object in a stack, wherein the first object and the second object overlap and abut against each other in the stack;
   a suction member;
   an actuator;
   a forming machine, wherein the suction member is configured to apply suction to the first object at the first location to cause the first object to be secured to the suction member; wherein the actuator is configured to simultaneously transport the suction member, the first object, and the second object away from the first location and toward a second location, the first object being secured to the suction member via suction, and the second object being secured to the suction member via the first object, wherein the suction member is configured to simultaneously surrender the first object and the second object to the second location, and wherein the forming machine is disposed proximate the second location and is configured to attach the first object and the second object together; and
   a handling device that is disposed at the second location, wherein the suction member is configured to simultaneously surrender the first object and the second object to the handling device, and wherein the handling device is configured to separate the first object and the second object.

23. The forming system of claim 22, wherein the actuator is configured to lift the suction member away from the first location with the first object secured to the suction member and the second object suspended from the first object.

24. The forming system of claim 22, wherein the suction member is configured to place an insert between the first object and the second object.

25. The forming system of claim 22, wherein the handling device includes a first vacuum rack and a second vacuum rack, wherein the suction member is configured to simultaneously surrender the first object and the second object to the second vacuum rack, and wherein the first vacuum rack is configured to seize the first object and leave the second object secured to the second vacuum rack.

26. The forming system of claim 22, wherein the forming machine is a thermoforming machine that is configured to heat the first object and the second object, wherein the thermoforming machine includes a mold that is configured to shape at least one of the first object and the second object.

27. The forming system of claim 26, further comprising an inflation device that is configured to inflate an area defined between the first object and the second object.

* * * * *